US010421217B2

(12) United States Patent
Li

(10) Patent No.: US 10,421,217 B2
(45) Date of Patent: Sep. 24, 2019

(54) 3D PRINTING DEVICE AND IMAGING SYSTEM THEREOF

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 352 days.

(21) Appl. No.: 15/122,388

(22) PCT Filed: Sep. 17, 2015

(86) PCT No.: PCT/CN2015/089851
§ 371 (c)(1),
(2) Date: Aug. 29, 2016

(87) PCT Pub. No.: WO2016/183985
PCT Pub. Date: Nov. 24, 2016

(65) Prior Publication Data
US 2017/0151717 A1    Jun. 1, 2017

(30) Foreign Application Priority Data

May 15, 2015 (CN) .......................... 2015 1 0247953

(51) Int. Cl.
*B29C 67/00* (2017.01)
*B29C 35/08* (2006.01)
(Continued)

(52) U.S. Cl.
CPC ........ *B29C 35/0805* (2013.01); *B29C 64/129* (2017.08); *B33Y 10/00* (2014.12);
(Continued)

(58) Field of Classification Search
CPC ... B29C 64/124; B29C 64/129; B29C 64/135; B29C 35/0805; B29C 2035/0827;
(Continued)

(56) References Cited

U.S. PATENT DOCUMENTS 5,497,254 A * 3/1996 Amako ............... G02B 5/188
349/181
2004/0038138 A1* 2/2004 Kiguchi ............. G02B 5/201
430/7
(Continued)

FOREIGN PATENT DOCUMENTS

CN      1530235 A     9/2004
CN   203254661 U    10/2013
(Continued)

OTHER PUBLICATIONS

International Search Report and Written Opinion in PCT/CN2015/089851 dated Feb. 15, 2016, with English translation. 15 pages.
(Continued)

*Primary Examiner* — Anthony Calandra
*Assistant Examiner* — Jerzi H Moreno Hernandez
(74) *Attorney, Agent, or Firm* — Womble Bond Dickinson (US) LLP

(57) ABSTRACT

A 3D printing device is provided, which includes a display panel including a plurality of pixels; a storage apparatus arranged in a light path of the display panel for storing a liquid light curable material, and a control component for controlling the display panel to perform imaging. The 3D printing device further includes a microlens array arranged in the light path between the display panel and the storage apparatus for adjusting the light path. The display panel further includes a light blocking matrix arranged at a non-pixel area of the display panel to separate the plurality of pixels from each other. The microlens array includes a plurality of microlenses arranged on the light blocking matrix, each microlens of the plurality of microlenses covers a single pixel of the plurality of pixels and light blocking layers of the light blocking matrix adjacent to the single pixel.

11 Claims, 2 Drawing Sheets

(51) Int. Cl.
  *B33Y 30/00*  (2015.01)
  *B33Y 10/00*  (2015.01)
  *B33Y 50/02*  (2015.01)
  *H04N 1/40*  (2006.01)
  *B29C 64/129*  (2017.01)
  *B29K 105/00*  (2006.01)
  *B22F 3/00*  (2006.01)

(52) U.S. Cl.
  CPC ............... *B33Y 30/00* (2014.12); *B33Y 50/02* (2014.12); *H04N 1/40* (2013.01); *H04N 1/40031* (2013.01); *B22F 3/008* (2013.01); *B22F 2999/00* (2013.01); *B29C 2035/0827* (2013.01); *B29K 2105/0058* (2013.01); *Y02P 10/295* (2015.11)

(58) Field of Classification Search
  CPC ................ B22F 2999/00; B22F 3/008; B29K 2105/0058; B33Y 50/02; B33Y 10/00; B33Y 30/00; H04N 1/40031; H04N 1/40; Y02P 10/295
  See application file for complete search history.

(56) References Cited

U.S. PATENT DOCUMENTS

| | | | |
|---|---|---|---|
| 2004/0179088 A1* | 9/2004 | Wong | B41J 2/45 347/238 |
| 2005/0191016 A1* | 9/2005 | Ishikawa | B23K 26/0604 385/115 |
| 2009/0322741 A1* | 12/2009 | Ito | G02B 27/2214 345/419 |
| 2011/0164318 A1* | 7/2011 | Yun | G02B 27/2214 359/463 |
| 2013/0295215 A1* | 11/2013 | Wu | B29C 67/0059 425/174.4 |
| 2015/0137426 A1* | 5/2015 | Van Esbroeck | B33Y 10/00 264/401 |
| 2015/0290876 A1* | 10/2015 | Liu | B33Y 30/00 264/401 |
| 2016/0264696 A1* | 9/2016 | Jeng | B29C 64/129 |
| 2016/0306266 A1* | 10/2016 | Hou | B33Y 10/00 |

FOREIGN PATENT DOCUMENTS

| | | |
|---|---|---|
| CN | 103381660 A | 11/2013 |
| CN | 103707510 A | 4/2014 |
| CN | 103722745 A | 4/2014 |
| CN | 203766034 U | 8/2014 |
| CN | 104249455 A | 12/2014 |
| CN | 104786508 A | 7/2015 |
| EP | 1 457 346 A1 | 9/2004 |
| JP | H 05162213 A | 6/1993 |

OTHER PUBLICATIONS

Office Action in Chinese Application No. 201510247953.2 dated Jul. 26, 2016, with English translation. 9 pages.
Office Action in Chinese Application No. 201510247953.2 dated Jun. 29, 2017, with English translation.
Office Action in Chinese Application No. 201510247953.2 dated Dec. 15, 2016, with English translation. 8 pages.

* cited by examiner

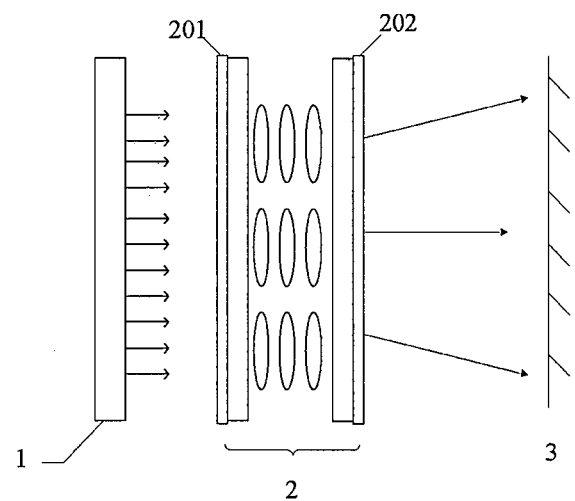
Fig. 1 -prior art-
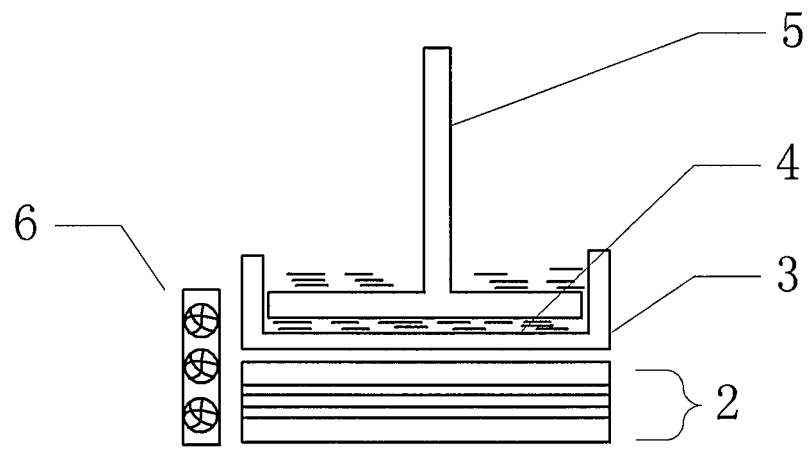
Fig. 2
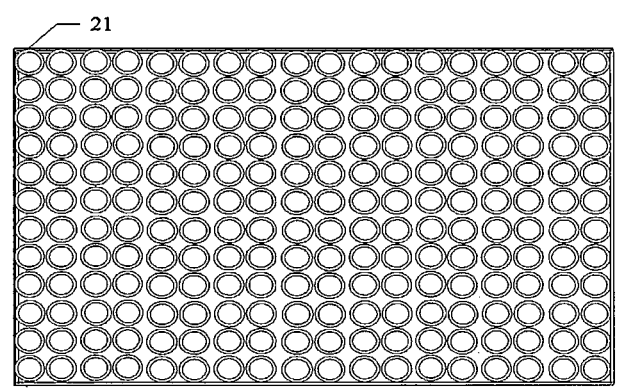
Fig. 3

3D PRINTING DEVICE AND IMAGING SYSTEM THEREOF

RELATED APPLICATIONS

The present application is the U.S. national phase entry of PCT/CN2015/089851, with an international filling date of Sep. 17, 2015, which claims the benefit of Chinese Patent Application NO. 201510247953.2, filed on May 15, 2015, the entire disclosure of which is incorporated herein by reference.

FIELD OF THE INVENTION

The present invention relates to the field of 3D printing, particularly to a 3D printing device and an imaging system thereof.

BACKGROUND

Three dimensional (3D) printing is a new type quick molding manufacturing technology, which is based on a three dimensional model designed by a computer. It stacks and bonds special materials such as metal powder, ceramic powder, plastic and cell tissues layer by layer by means of a software layered discrete and numerical control molding system to finally achieve stack molding, so as to obtain an entity product. It can overcome the special structural barriers that cannot be achieved by the conventional mechanical processing, and carry out simple production of complex structural members.

At present, the 3D printing technology mainly includes heat melt plastic base technology, laser sintering molding technology, light curable liquid resin selective area curing molding technology, etc. The light curing method performs material accumulation for molding by using the principle that the light curable material is cured after being irradiated by light.

The existing imaging system for the 3D printing device generally cures the light curable material using a liquid crystal panel. As schematically shown in FIG. 1, the conventional imaging system comprises a light source system 1 as a backlight and a liquid crystal screen 2. The two sides of the liquid crystal screen 2 are further respectively provided with polarizers 201, 202. The light emitted by the liquid crystal screen 2 is projected on a surface 3 of the light curable material so as to enable the light curable material to be cured. Generally, the polarizers 201, 202 would absorb the light emitted by the light source system 1 greatly, causing a low utilization ratio for the light emitted by the light source system 1 and a high power consumption of the whole system. In addition, long term near ultraviolet irradiation would accelerate aging of the liquid crystal material, thereby influencing the life time of the 3D printing device.

SUMMARY

In view of this, embodiments of the invention provide an imaging system for a 3D printing device and a 3D printing device comprising the imaging system that can mitigate or avoid the above problem.

According to an embodiment of the invention, an imaging system for a 3D printing device is provided. The imaging system may comprise a display panel comprising a plurality of pixels, a storage apparatus arranged in a light path of the display panel for storing a liquid light curable material, and a control component for controlling the display panel to perform imaging. The display panel performs imaging on an interface of the light curable material so as to enable the light curable material to be cured at the interface to form a pattern, and the display panel is an active light emitting panel.

Since the imaging system does not require a polarizer, it avoids the polarizer from absorbing the light emitted by the light source within the imaging system. On the other hand, because there is not backlight, and the pattern is formed by directly using the light emitted by the display panel, hence, the light path is shortened and the optical loss is reduced. Consequently, the utilization ratio of light is improved and the power consumption of the whole system is reduced. Accordingly, the loss of the imaging system is reduced, which improves the output power indirectly. The curing time of the light curable material may be reduced, thereby increasing the efficiency of the 3D printing device.

According to an embodiment of the invention, the imaging system further comprises a microlens array. The microlens array is arranged in the light path between the display panel and the storage apparatus for adjusting the light path.

Further, the microlens array comprises a plurality of microlenses arranged on a light emitting surface of the display panel. A side of the microlens away from the display panel is a convex surface, and a projection of a center of any of the microlenses and a projection of a center of a corresponding pixel coincide on the display panel.

The microlens may perform convergence or collimation to the light emitted by each pixel of the display panel. In this way, the directivity of the light emitted by each pixel can be enhanced, the crosstalk caused by light divergence between respective pixels of the display panel can be reduced, and the quality of the 3D printing product can be improved. What's more, because the microlens has converging effect to the light emitted by each pixel, the liquid light curable material can be cured more quickly, the exposure time can be further shortened, and the production efficiency of the 3D printing device may be improved.

According to another embodiment of the invention, a focal plane of the microlens and the interface where the light curable material is cured are in a same plane. Thus, not only the imaging quality of the imaging system at the interface where the light curable material is cured can be improved, the exposure time can be further shortened, and the printing efficiency of the 3D printing device can be further increased.

According to another embodiment of the invention, the display panel of the 3D printing device further comprises a light blocking matrix. The light blocking matrix is arranged at a position on the light emitting surface of the display panel corresponding to a non-pixel area. The light blocking matrix may reflect or absorb light to mitigate light leakage phenomenon at the edge of the pixel, thereby mitigating the influence by the light leakage phenomenon of the pixel of the display panel to the imaging.

Further, the thickness of the light blocking matrix may be 1 to 3 times of the thickness of the pixel. Such light blocking matrix may achieve a better blocking or absorbing to the light at the edge of the pixel, and further mitigate the influence by the light leakage phenomenon of the pixel of the display panel to the imaging.

According to an embodiment of an imaging system for a 3D printing device of the invention, the display panel comprises a light emitting diode (LED) display panel. The light emitting diode display panel comprises a plurality of pixels consisting of light emitting diode units.

According to another embodiment of the invention, the spectrum range of the light emitting diode unit is 400 nm to 420 nm.

According to another embodiment of the invention, the light emitting material of the light emitting diode comprises gallium nitride or aluminum nitride.

According to another embodiment of the invention, the display panel in the imaging system for the 3D printing device may comprise an organic light emitting diode (OLED) display panel.

According to another embodiment of the invention, a characteristic of a light emitting layer material of the organic light emitting diode meets a condition of ΔE=2.79~3.14, ΔE is an energy level difference of a ground state and an excited state of the light emitting layer material of the organic light emitting diode.

According to another embodiment of the invention, the display panel comprises a plasma display panel.

According to another embodiment of the invention, the control component controls the display panel to perform imaging such that the pixels thereof are only in an open state or a closed state.

An embodiment of the invention further provides a 3D printing device. The 3D printing device may comprise an imaging system in any one of the various embodiments of the imaging system for a 3D printing device according to the invention.

When the 3D printing device comprising the imaging system provided by respective embodiments of the invention is applied to perform 3D printing operation, since the light path is shortened and the optical loss is reduced, the utilization ratio of the light is thus improved and the power consumption of the whole system is reduced. Accordingly, the loss of the imaging system is reduced, which can increase the output power and reduce the curing time of the light curable material, thereby increasing the 3D printing efficiency.

BRIEF DESCRIPTION OF THE DRAWINGS

Now, the concept of the invention will be described with reference to the drawings through specific embodiments.

FIG. 1 illustrates a structural view of an imaging system for a 3D printing device in the prior art;

FIG. 2 illustrates a structural view of an imaging system for a 3D printing device according to an embodiment of the invention;

FIG. 3 illustrates a plan view of a pixel structure of a display panel in an imaging system for a 3D printing device according to an embodiment of the invention;

DETAILED DESCRIPTION OF THE INVENTION

Figure 4:
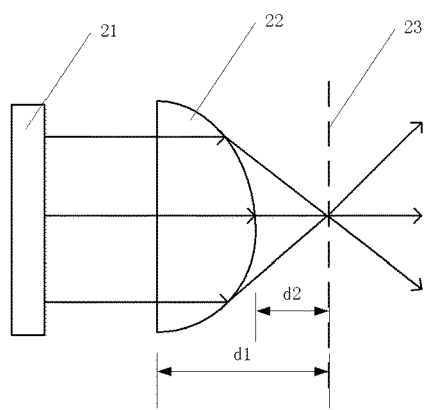
FIG. 4 shows a view illustrates a positional relationship between an interface where the light curable material is cured and a microlens on a light emitting surface of the display panel according to another embodiment of the invention.

Next, implementations of the imaging system according to embodiments of the invention will be explained with reference to the drawings by way of examples. The drawings are just schematic and are not drawn to scale, moreover, they are only for explaining the embodiments of the invention, rather than intending to limit the protection scope of the invention.

FIG. 2 illustrates an imaging system for a 3D printing device according to an embodiment of the invention. The imaging system comprises a display panel 2, a storage apparatus 3 and a control component (not shown in the figure). The display panel 2 comprises a plurality of pixels. The storage apparatus 3 is arranged in a light path of the display panel 2, for storing a liquid light curable material 4. The control component controls the display panel 2 to perform imaging. The display panel 2 performs imaging on an interface of the light curable material so as to enable the light curable material to be cured at the interface to form a corresponding pattern. The display panel 2 is an active light emitting panel.

In 3D printing operation, a three dimensional CAD entity data model or curved surface data model file of an object may be firstly converted into a standard file format in the computer, for example, the file format of .stl, and then, a series of slice layers of a preset thickness are cut out from the .stl file using a computer software. Then, a two dimensional data graph is formed by the information of each slice layer. After image processing of the computer, an image corresponding to the two dimensional data graph of each slice layer can be displayed on the display panel 2 by means of the control component. The area of the display panel for displaying a profile of the image can be a light emitting area, for example, it can be a white area. The area that does not display the profile of the image may not emit light, for example, it can be a black area. That is to say, the bright area of the display panel may be a molding area for the displayed image. The light emitting element in the dark area of the display panel does not emit light. Accordingly, only the area of the liquid level of the light curable material 4 in the storage apparatus 3 that corresponds to the molding area can be cured by the light emitted by the display panel 2. In this way, the image corresponding to the two dimensional data graph of each slice layer can be projected onto the light curable material 4 through the display panel 2, so as to perform exposure and curing to the light curable material 4.

In addition, in the embodiment of the imaging system for a 3D printing device according to the invention, the bottom of the storage apparatus 3 may be transparent, so as to enable the light emitted from the display panel 2 to be transmitted and pass through. The light curable material 4 comprises a material that can be cured after being irradiated by light, e.g., light curable resin.

Compared with the conventional imaging system that utilizes a liquid crystal panel, in the imaging system for a 3D printing device according to the embodiment of the invention, since the display panel 2 does not require backlight and polarizer, the absorption of the light emitted by the light source within the imaging system by the polarizer may be avoided. On the other hand, because there is not backlight, and the pattern is formed by directly using the light emitted by the display panel, hence, the light path is shortened and the optical loss is reduced, consequently, the utilization ratio of light is improved and the power consumption of the whole system is reduced. Accordingly, the loss of the imaging system is reduced and the output power thereof may be improved. The curing time of the light curable material may be reduced, increasing the efficiency of the 3D printing device.

In an embodiment of the imaging system for a 3D printing device according to the invention, the pixels of the display panel 2 can be arranged in the form of a matrix. For example, FIG. 3 illustrates a plurality of pixels of the display panel 2 arranged in a matrix, and each circle in this figure may represent one pixel 21.

In another embodiment, the imaging system further comprises a microlens array. The microlens array is arranged in a light path between the display panel and the storage apparatus for adjusting the light path. The microlens can perform convergence or collimation to the light emitted by each pixel of the display panel. In this way, light divergence at each pixel of the display panel can be mitigated, light crosstalk can be reduced, and the imaging quality of the imaging system may be improved. Meanwhile, due to the converging or collimating effect by the microlens to the light emitted from each pixel, the curing speed of the liquid light curable material can be enhanced, so as to further shorten the operation time of 3D printing.

In an embodiment, the microlens array comprises a plurality of microlenses arranged on a light emitting surface of the display panel. A side of the microlens away from the display panel is a convex surface, and a projection of a center of any microlens and a projection of a center of a corresponding pixel coincide on the display panel. For example, as illustrated in FIG. 4, a microlens 22 is arranged above each pixel 21 of the display panel. The projection of the center of the microlens 22 and the projection of the center of the pixel 21 coincide on the display panel. Certainly, it should be understood that such coincidence is not absolute, which allows an appropriate error. The microlens 22 may be a convergent lens that performs convergence or collimation to the light emitted by the pixel 21. The light emitted by the pixel 21 is converged at a focal plane 23 after passing through the microlens 22. As shown in FIG. 4, d1 is the focal distance of the microlens 22, d2 is a distance from the top of the microlens 22 to the focal plane 23 of the microlens.

In an embodiment, d2 may also be a distance from an interface where the light curable material is cured to the top of the microlens, i.e., the focal plane 23 of the microlens 22 and the interface where the light curable material is cured are in a same plane. In this way, not only the imaging quality of the imaging system at the interface where the light curable material is cured can be improved, the exposure time can be further shortened, and the production efficiency of the 3D printing device can be further enhanced.

It should be noted that, FIG. 4 just intends to illustrate a positional relationship between the interface where the light curable material is cured and the microlens on the light emitting surface of the display panel in an embodiment. It does not represent the actual structural relationship between the microlens 22 and the pixel 21. For example, the microlens 22 may be arranged within the display panel (e.g., directly arranged on the pixel 21), alternatively the microlens 22 may also be arranged on a surface of a glass substrate of the display panel, as long as the microlens 22 can play the function of collimating or converging the light emitted by the pixel 21 so as to mitigate light crosstalk between adjacent pixels.

Figure 5:
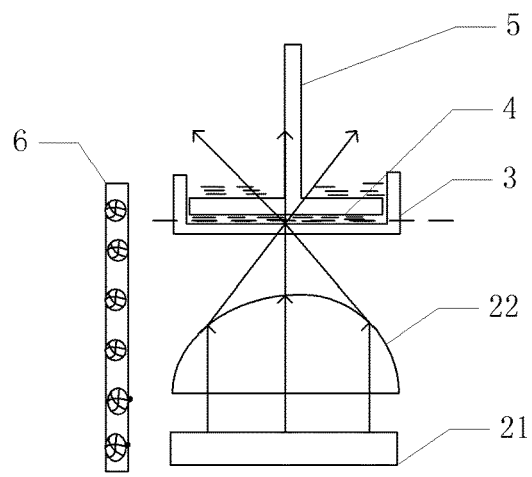
FIG. 5 illustrates a structural view of an imaging system for a 3D printing device according to another embodiment of the invention.

FIG. 5 illustrates a structural view of an imaging system for a 3D printing device according to another embodiment of the invention. In this embodiment, a microlens 22 may be arranged above each pixel 21 of the display panel. The microlens 22 may be a convergent lens and may perform convergence or collimation to the light emitted by the pixel 21. Further, the focal plane of the microlens 22 may be in the same plane as the interface where the light curable material 4 is cured, which may not only improve the imaging quality of the imaging system at the interface where the light curable material is cured, but also further shorten the exposure time and improve the printing efficiency of the 3D printing device.

Figure 6:
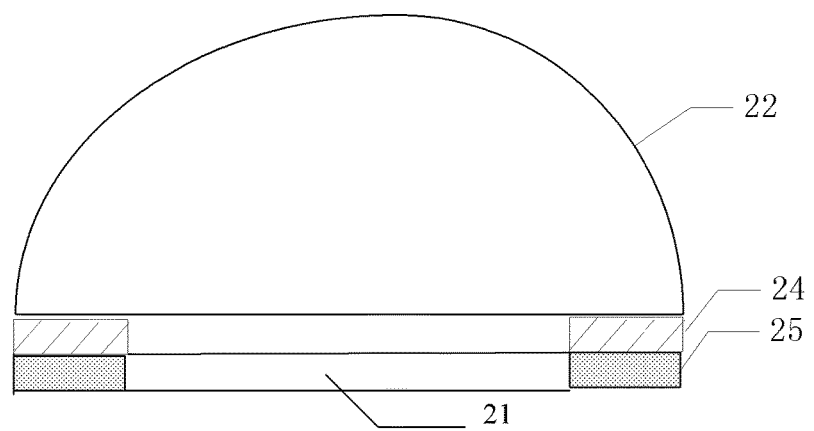
FIG. 6 illustrates a sectional view of a single pixel on which a light blocking matrix and a microlens are arranged in an imaging system for a 3D printing device according to a further embodiment of the invention.

According to a further embodiment of the invention, the display panel in the imaging system for a 3D printing device in the above embodiments may further comprise a light blocking matrix. The light blocking matrix may be arranged at a non-pixel area of the display panel to separate the plurality of pixels from each other. The light blocking matrix is a pattern formed by a material that can reflect or absorb light, e.g., a black matrix, etc. In the display panel of the imaging system for a 3D printing device according to the embodiment of the invention, the light blocking matrix may be arranged only, or the light blocking matrix and the microlens array may be both arranged. For example, as an example, as shown in FIG. 6, a layer of relatively thick light blocking matrix 24 may be arranged at a position on the light emitting surface of the display panel corresponding to a non-pixel area 25 along the periphery of each pixel 21 of the display panel. Meanwhile, a microlens 22 may be arranged above the light blocking matrix 24. Each microlens 22 of the plurality of microlenses covers a single pixel 21 of the plurality of pixels and light blocking layers of the light blocking matrix 24 adjacent to the single pixel 21. By arranging the light blocking matrix on the light emitting surface of the display panel, light leakage phenomenon at the edge of the pixel can be mitigated, thereby reducing interference by the light leakage phenomenon of the pixels of the display panel to the imaging.

Further, the thickness of the light blocking matrix may be greater than the thickness of the black matrix in a general display device. For example, the thickness of the light blocking matrix may be 1 to 3 times of the thickness of each pixel. The light blocking matrix of this thickness may block or absorb light at the edge of the pixel effectively, thereby mitigating interference by the light leakage phenomenon of the pixel of the display panel to the imaging. Similarly, the light blocking matrix may be arranged within the display panel (e.g., it can be directly arranged above each pixel), alternatively, it can also be arranged on a surface of the glass substrate of the display panel.

In an embodiment of the imaging system for a 3D printing device according to the invention, the pixel of the display panel 2 comprises a LED unit. Certainly, the light emitting elements for the pixels of the display panel 2 may also be any other light emitting elements that can emit light capable of enabling the light curable material 4 to be cured.

The LED may emit near ultraviolet (UV) light, i.e., curing the light curable material 4 using the UV curing principle. The light emitting material of the LED may comprise gallium nitride or aluminum nitride. The LED may comprise a near UV LED and a deep UV LED. The light emitting wavelength of the near UV LED may be greater than 380 nm. The light emitting wavelength of the deep UV LED may be less than 300 nm. Various UV LEDs may have different central wavelengths. For example, the central wavelength of the deep UV LED using gallium nitride may be 282 nm. The deep UV LED using aluminum nitride may have a central wavelength of 210 nm. The UV LED with a relatively short central wavelength has a relatively long life time and has the characteristics of good monochromaticity, small volume, high response speed and high reliability.

In an embodiment, the spectrum range of the LED unit in the display panel is 400 nm to 420 nm. Using UV light of a relatively long wavelength to perform irradiation may further improve the utilization ratio of light of the system, because the UV light of a short wavelength is prone to be absorbed by materials such as glass in the imaging system.

According to yet another embodiment of the invention, the display panel in the imaging system for a 3D printing device comprises an OLED organic light-emitting diode) display panel.

Further, the OLED elements whose light spectrums are within the ranges of the UV light and near UV light may be selected. Based on different application standards, the UV light spectrum may be divided into several spectrum ranges, e.g., UV-A: 250 nm-280 nm, UV-B: 280 nm-320 nm, UV-C: 320 nm-390 nm, UV-V: 395 nm-445 nm, etc. The UV light emitted by the OLED element should match with and correspond to the specific light curable material 4. For the material (the material of the light emitting layer) of the OLED element, it can be determined whether the material used meets a energy gap range based on the energy level difference $\Delta E$ (i.e., the energy gap) between the ground state and the excited state of this material after the wavelength of the UV light to be used is determined based on the specific light curable material 4. The energy gap of the material can be calculated according to the following equation (1):

$$\Delta E = h\nu = hc/\lambda = 1241/\lambda \quad (1)$$

wherein h is the Planck's constant, $\kappa$ is the frequency of light, c is velocity of light, $\lambda$ is the wavelength of the absorption spectrum.

For example, for the light spectrum in the range of UV-V: 395 nm-445 nm, the energy level difference required by this wavelength is: $\Delta E = 1241/\lambda = 1241/445 \sim 1241/395 = 2.79 \sim 3.14$. Therefore, the light emitting layer material of the corresponding OLED may be selected only based on $\Delta E$. In other words, the characteristic of the light emitting layer material of the OLED meets the above equation (1).

According to a further embodiment of the invention, the display panel may comprise a plasma display panel.

According to another embodiment of the invention, the control component in the imaging system for a 3D printing device controls the display panel to perform imaging such that the pixels thereof are only in an open state or a closed state. That is to say, each pixel of the display panel only comprises two states of bright and dark, while not having to perform adjustment of gray scale and brightness. Each pixel of the display panel may be independently controlled by the control component to be turned on or turned off, so as to display correct image information on the display panel based on the two dimensional data graph formed using information of each slice layer.

An embodiment of the invention further provides a 3D printing device, which may comprise an imaging system in any one of the preceding embodiments of the imaging system for a 3D printing device according to the invention. Therefore, the 3D printing device comprising the imaging system described in the embodiment of the invention may also have similar characteristics and advantages.

The 3D printing device may further comprise a lifter and a cooling member. As shown in FIG. 2, the 3D printing device according to the embodiment of invention may further comprise a lifter 5 with a supporting plate and a cooling member 6. After each exposure and curing of one layer of liquid light curable material 4, the lifter 5 that can be moved up and down mechanically rises by a height of one layer thickness. The cured light curable material layer also rises with the supporting plate of the lifter 5, and then the display panel 2 continues to perform exposure and curing to the liquid light curable material 4 that enters the bottom of the storage apparatus 3. Thus, printing for all slice layers may be accomplished successively until 3D printing of the whole product is finished. The cooling member 6 may cool the display panel 2 to keep a not too high operating temperature of the display panel 2, so as to prolong the use life thereof. The cooling member 6 may be any appropriate temperature reducing member such as a fan.

Although the exemplary embodiments of the invention have been described in detail with reference to the drawings, such description should be regarded as illustrative or exemplary, rather than restrictive. The present invention is not limited to the disclosed embodiments. Different embodiments described above and in the claims may also be combined. The skilled person in the art, when practicing the present invention as claimed, can understand and effect other modifications of the disclosed embodiments based on the study on the drawings, the disclosure and the claims. These modifications also fall within the protection scope of the invention.

In the claims, the word "comprise" does not exclude the presence of other elements or steps. The fact that several technical measures have been recited in mutually different dependent claims does not mean that the combination of these technical measures cannot be utilized advantageously.

The invention claimed is:

1. A 3D printing device comprising:
    a display panel comprising a plurality of pixels;
    a storage apparatus arranged in a light path of the display panel for storing a liquid light curable material, and
    a control component configured to control the display panel to perform imaging,
    wherein the display panel performs imaging on an interface of the light curable material, so as to enable the light curable material to be cured at the interface to form a pattern, and the display panel is an active light emitting panel,
    wherein the 3D printing device further comprises a microlens array, which is arranged in the light path between the display panel and the storage apparatus for adjusting the light path,
    wherein the display panel further comprises a non-pixel area along the periphery of each pixel,
    wherein the display panel further comprises a light blocking matrix comprising light blocking layers positioned on the non-pixel area, the lateral edges of the light blocking layers are aligned with the lateral edges of the non-pixel area, the light blocking layers and the non-pixel area are configured to separate the plurality of pixels from each other, and
    wherein the microlens array comprises a plurality of microlenses arranged on the light blocking matrix, each microlens of the plurality of microlenses covers a single pixel of the plurality of pixels and the light blocking layers of the light blocking matrix delimiting the single pixel.

2. The 3D printing device according to claim 1, wherein a side of the microlens away from the display panel is a convex surface, and a projection of a center of any of the microlenses and a projection of a center of a corresponding pixel coincide on the display panel.

3. The 3D printing device according to claim 2, wherein a focal plane of the microlens and the interface where the light curable material is cured are in a same plane.

4. The 3D printing device according to claim 1, wherein a thickness of the light blocking matrix is 1 to 3 times of a thickness of a pixel material in the pixel.

5. The 3D printing device according to claim 1, wherein the display panel comprises a light emitting diode display panel, the light emitting diode display panel contains a plurality of pixels consisting of light emitting diode units.

6. The 3D printing device according to claim 5, wherein a spectrum range of the light emitting diode unit is 400 nm to 420 nm.

7. The 3D printing device according to claim 5, wherein a light emitting material of the light emitting diode comprises gallium nitride or aluminum nitride.

8. The 3D printing device according to claim 1, wherein the display panel comprises an organic light emitting diode display panel.

9. The 3D printing device according to claim 8, wherein a characteristic of a light emitting layer material of the organic light emitting diode meets a condition of $\Delta E=2.79$ eV~3.14 eV, wherein $\Delta E$ is an energy level difference of a ground state and an excited state of the light emitting layer material of the organic light emitting diode.

10. The 3D printing device according to claim 1, wherein the display panel comprises a plasma display panel.

11. The 3D printing device according to claim 1, wherein the control component controls the display panel to perform imaging such that the pixels thereof are only in an open state or a closed state.

\* \* \* \* \*